(No Model.)

M. WISE.
APPARATUS FOR MAKING EXTRACTS FROM VEGETABLE SUBSTANCES.

No. 253,802. Patented Feb. 14, 1882.

Witnesses.
Chas. Wahlers.
William Miller.

Inventor:
Morris Wise
by Van Santvoord & Hauff
Attys.

UNITED STATES PATENT OFFICE.

MORRIS WISE, OF NEW YORK, N. Y., ASSIGNOR TO THE WEST INDIA MANUFACTURING COMPANY, OF SAME PLACE.

APPARATUS FOR MAKING EXTRACTS FROM VEGETABLE SUBSTANCES.

SPECIFICATION forming part of Letters Patent No. 253,802, dated February 14, 1882.

Application filed July 9, 1881. (No model.)

*To all whom it may concern:*

Be it known that I, MORRIS WISE, a citizen of the United States, residing at New York, in the county and State of New York, have invented new and useful Improvements in Apparatus for Making Extracts from Vegetable Substances, of which the following is a specification.

This invention relates to apparatus for obtaining extracts from pimento-leaves and other vegetable substances by the action of steam and water; and it consists in the combination, with a distilling-tank, of a foraminous false bottom constructed with a central upwardly-projecting hollow foraminous stem having laterally-projecting hollow foraminous branches, so that if steam is admitted to the tank below the false bottom it rises not only through such bottom, but also into and through the foraminous stem and its branches, whence it escapes, thus thoroughly diffusing itself in the contents of the tank. With the tank and its said false bottom are combined a secondary foraminous false bottom, and a steam-supply pipe which, is connected to the tank between the two false bottoms, so that the secondary false bottom has a tendency to retard the escape of live steam, at the same time allowing the escape of the water of condensation.

Figure 1:
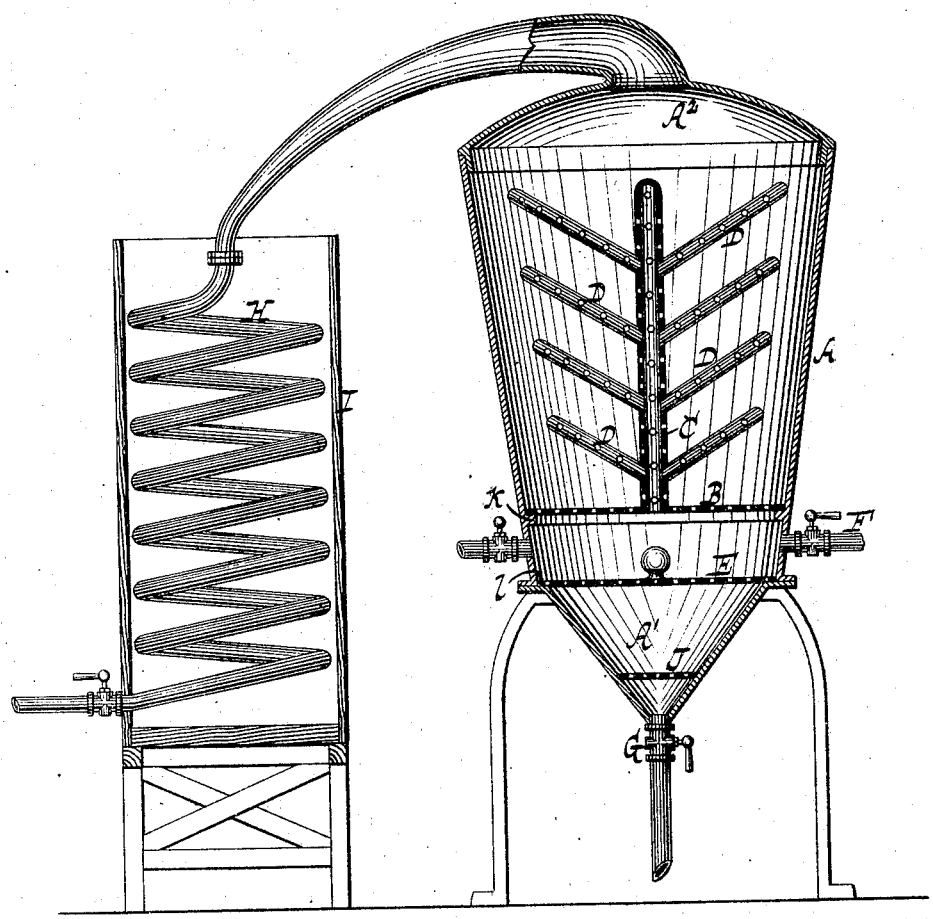
Figure 2:
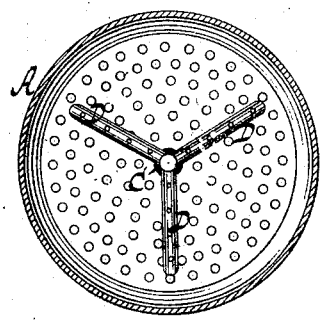

This invention is illustrated in the accompanying drawings, in which Figure 1 represents a vertical central section. Fig. 2 is a horizontal section of the distilling-tank.

Similar letters indicate corresponding parts.

The letter A designates the distilling-tank; B, the primary false bottom; C, its stem having branches D; E, the secondary false bottom, and F the steam-supply pipe.

The side of the tank A tapers toward its lower end, and its main bottom A' is funnel-shaped, the neck thereof being provided with a stop-cock, G, while the top A² of the tank is removable, and is connected to a condensing-coil, H, arranged in a cooler, I. A strainer, J, moreover, is placed in the funnel-shaped bottom A', to prevent clogging.

The two false bottoms B E rest on shoulders $k\,l$ in the tank, so that they are removable, and both are made foraminous, as of perforated sheet metal, the lower or secondary false bottom being, moreover, provided with a handle.

The stem C projects upwardly from the primary false bottom B at the center thereof, and its branches D project from the stem in lateral directions, and preferably with an upward inclination, both the stem and branches being hollow and being made foraminous, as by providing them with numerous small holes. The steam-supply pipe F is connected to the tank A at a point between the two false bottoms B E, and it is provided with a suitable stop-cock.

It will be seen that if the steam is admitted to the tank by the supply-pipe F it ascends through the primary false bottom B, as well as into and through the stem C and its branches D, escaping therefrom through their holes, and in this manner the steam is caused to penetrate to every portion of the tank, and thus diffuse itself thoroughly in the leaves or other substance contained therein. The secondary false bottom E, moreover, has a tendency to retard the escape of live steam in a lower direction, while it allows the escape of the water resulting from any condensation of the steam in the space between the two false bottoms.

In applying the apparatus to use the tank is filled with the substance from which an extract is to be made—say pimento-leaves—above the primary false bottom B, and the top A² having been tightly closed, the cock of the steam-supply pipe F is opened. The steam thus admitted to the tank acts on the leaves therein and escapes to the coil H, carrying with it the essential oil, and being thus condensed, it is afterward concentrated and purified. When the leaves have been thus freed from the essential oil the steam is shut off, and the leaves are removed, to be subsequently treated with water in a suitable vessel for the purpose of charging the same with the astringent matter contained in the leaves.

What I claim as new, and desire to secure by Letters Patent, is—

1. The combination, with a distilling-tank, of a foraminous false bottom provided with an attached foraminous vertical stem having lateral foraminous branches, substantially as described, whereby the steam admitted beneath the false bottom will enter the tank through the false bottom and through the stem and its branches, as and for the purpose set forth.

2. The combination, substantially as hereinbefore set forth, with the distilling-tank A, of the primary foraminous false bottom B, the secondary false bottom E, and the central upwardly-projecting hollow foraminous stem of the primary bottom, having laterally-projecting foraminous branches.

In testimony whereof I have hereunto set my hand and seal in the presence of two subscribing witnesses.

MORRIS WISE. [L. S.]

Witnesses:
ERNEST T. FELLOWS,
CHAS. WAHLERS.